April 29, 1930.　　　　M. T. VOIGT　　　　1,756,576
TRANSMISSION APPARATUS
Filed Oct. 4, 1928　　　2 Sheets-Sheet 2
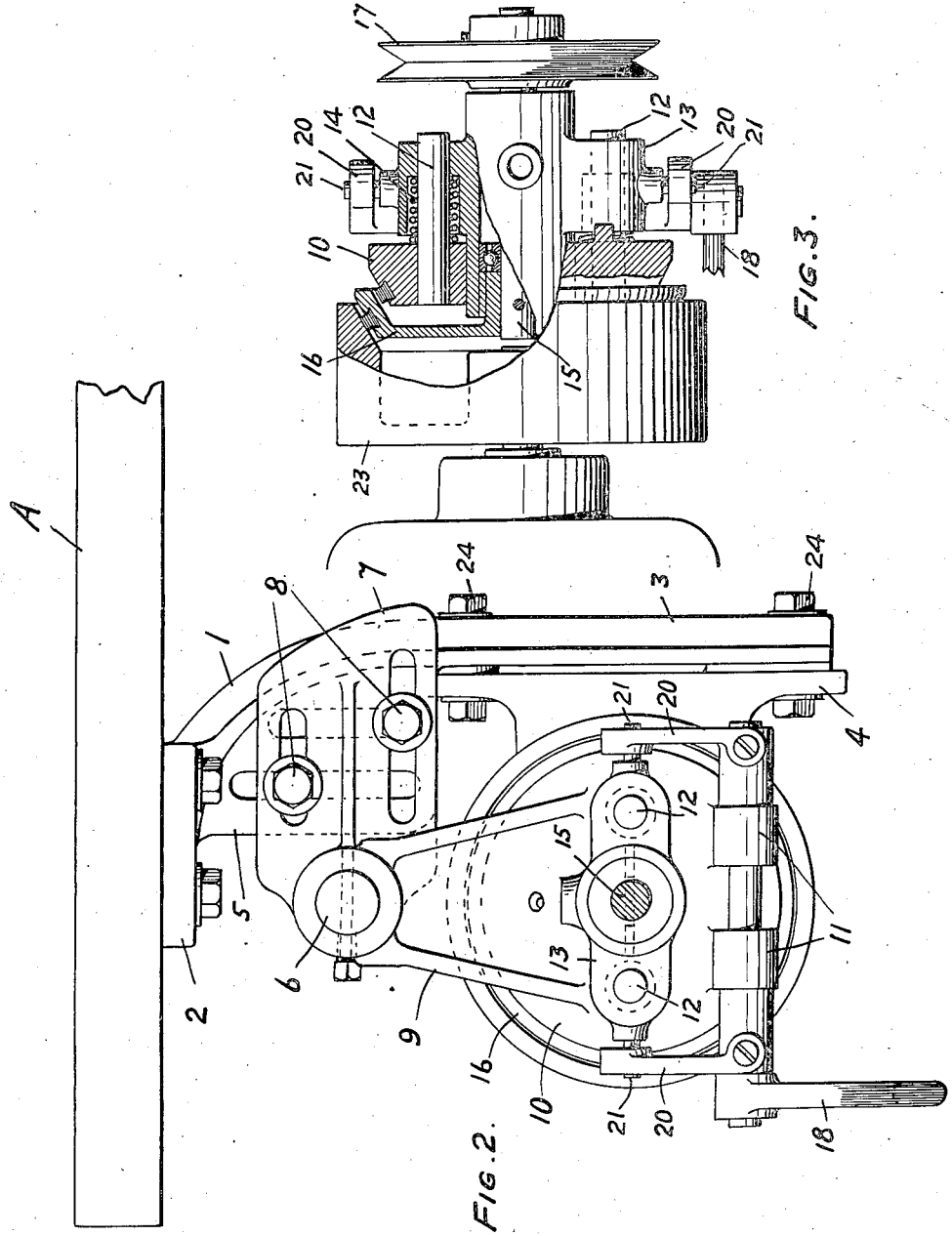
INVENTOR
Max T. Voigt Patented Apr. 29, 1930

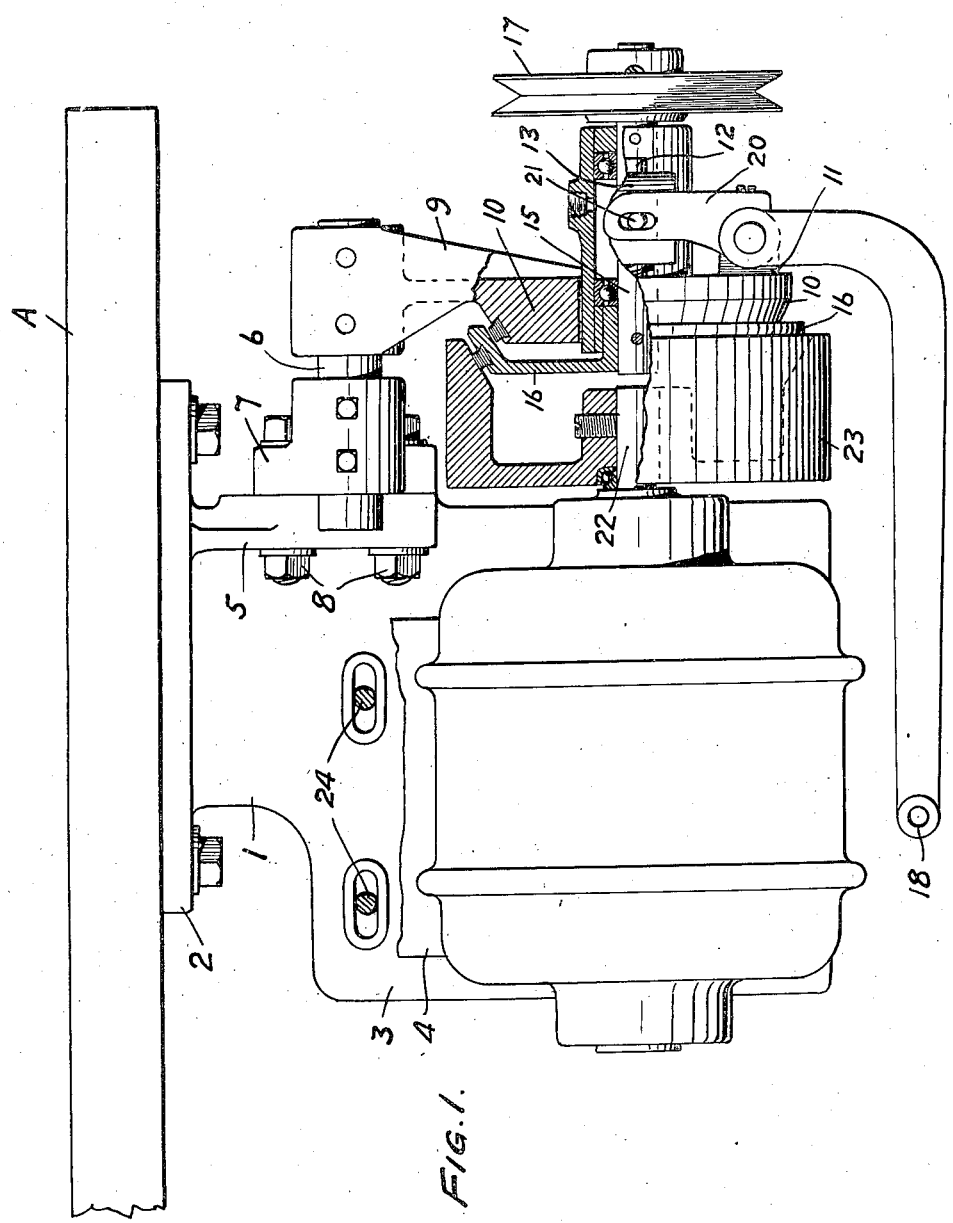

1,756,576

UNITED STATES PATENT OFFICE

MAX T. VOIGT, OF READING, PENNSYLVANIA, ASSIGNOR, BY MESNE ASSIGNMENTS, TO AMERICAN SAFETY TABLE COMPANY, INC., OF READING, PENNSYLVANIA, A CORPORATION OF PENNSYLVANIA

TRANSMISSION APPARATUS

Application filed October 4, 1928. Serial No. 310,203.

The principal object of the present invention is to provide power transmission apparatus of simple and durable construction and of reliable operation.

Another object of the invention is to provide for the use of the apparatus with different kinds of electric motors or in fact with any kind or type of electric motors.

Other objects of the invention will appear from the following description at the end of which the invention will be claimed and in connection with which reference will be made to the accompanying drawings forming part hereof and in which Figure 1 is a side view with parts in section.

Fig. 2 is an end view with the pulley and motor omitted, and

Fig. 3 is a top or plan view partly in section.

Referring to the drawings, 1 is a suspension frame shown as comprising a foot 2 for attachment to a table as A, a flat portion 3 for attachment to the base 4 of a motor, and an intermediate curved portion having a web 5. There is a bracket depending from the frame and the bracket comprises two parts connected by the post 6. One part 7 of the bracket is a slide adjustably connected with the frame by bolts and slots 8, and the other part 9 of the bracket is turnably adjustable by the post 6.

The part 9 of the bracket as a portion thereof includes the braking surface 10, the ears 11, and the parallel pins 12. There is a cross head 13 mounted to move on the pins 12, and there are springs 14 interposed between the crosshead and bracket and they are shown as encircling the pins 12, Fig. 3. The crosshead carries the revoluble shaft 15 at one end of which there is a driven element 16, and at the other end of which there is a pulley 17, useful for driving a sewing machine. The shaft 15 is shown as mounted in the crosshead by means of annular ball bearings. 18 is a pedal lever having its shaft journaled in the ears 11 and provided with arms 20 connected with the crosshead 13, or more accurately, with studs 21 at the ends thereof. On the motor shaft 22 there is arranged a driving element 23 spaced from the driven element 16, and the driven element 16 is spaced from the braking surface 10. When the lever 18 is released the driven element 16 contacts with the braking surface 10, the springs 14 assisting in moving the crosshead on the pins 12. When the lever 18 is pulled down its arms 20 move the crosshead on the pins and the driven element 16 engages the driving element 23, thereby rotating the pulley 17.

By means of the appropriate bolts and slots 24, motors of different styles and sizes may be connected through the base thereof to the bracket, and the shaft 15 can be properly aligned with the motor shaft 22 by the adjustments 6 and 8 already described. As a whole the device is simple, and the crosshead moving on pins constitutes durable means for shifting the driven element 16.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. Transmission apparatus comprising in combination spaced driving and brake elements, a crosshead, parallel guides for the crosshead, a revoluble shaft carried by the crosshead and provided at one end with a pulley and at the other end with a driven element arranged between the spaced driving and brake elements, and means for moving the crosshead.

2. Transmission apparatus comprising in combination spaced driving and brake elements, a crosshead, parallel guides for the crosshead, a revoluble shaft carried by the crosshead and provided at one end with a pulley and at the other end with a driven element arranged between the spaced driving and brake elements, means for moving the crosshead in one direction, and springs encircling the pins for moving the crosshead in the other direction.

3. Transmission apparatus comprising in combination a suspension frame, an electric motor detachably carried by the frame and provided with a driving element, a bracket depending from the frame and provided with a braking surface, means for adjustably connecting the bracket with the frame to accommodate motors of different kinds, parallel pins projecting from the bracket, a crosshead movable on the pins, means interposed between the bracket and crosshead for moving the latter, and a revoluble shaft carried by the crosshead and provided at one end with a driven element and at the other end with a pulley.

MAX T. VOIGT.